(12) United States Patent
Fehr et al.

(10) Patent No.: US 8,924,096 B2
(45) Date of Patent: Dec. 30, 2014

(54) IMPLEMENT CONTROLLER HAVING ANGULAR RATE CORRECTION

(71) Applicant: Caterpillar Inc., Peoria, IL (US)

(72) Inventors: Drew Alan Fehr, Washington, IL (US); Paul R. Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 141 days.

(21) Appl. No.: 13/665,472

(22) Filed: Oct. 31, 2012

(65) Prior Publication Data

US 2014/0121909 A1    May 1, 2014

(51) Int. Cl.
*G06F 7/70* (2006.01)

(52) U.S. Cl.
USPC .......................................................... 701/50

(58) Field of Classification Search
USPC ..................................... 701/23, 26, 37, 38, 50
See application file for complete search history.

(56) References Cited

U.S. PATENT DOCUMENTS

| | | | |
|---|---|---|---|
| 5,860,480 A | 1/1999 | Jayaraman et al. | |
| 5,987,371 A | 11/1999 | Bailey et al. | |
| 6,298,288 B1 | 10/2001 | Li et al. | |
| 6,332,103 B1 | 12/2001 | Steenson, Jr. et al. | |
| 6,377,906 B1 * | 4/2002 | Rowe | 702/151 |
| 7,222,007 B2 | 5/2007 | Xu et al. | |
| 7,590,481 B2 | 9/2009 | Lu et al. | |
| 7,844,380 B2 | 11/2010 | Han et al. | |
| 8,145,391 B2 | 3/2012 | Omelchenko et al. | |
| 2008/0269963 A1 | 10/2008 | Vos et al. | |
| 2009/0069987 A1 | 3/2009 | Omelchenko et al. | |
| 2010/0312428 A1 * | 12/2010 | Roberge et al. | 701/23 |

* cited by examiner

*Primary Examiner* — Kim T Nguyen

(74) *Attorney, Agent, or Firm* — Finnegan, Henderson, Farabow, Garrett & Dunner LLP

(57) ABSTRACT

A system and method of controlling an earth moving implement of a machine is disclosed. The method may include receiving a pitch rate of the machine in a body reference frame and determining a roll of the machine. The method may further include determining a turning rate of the machine and calculating a pitch rate of the machine in a gravity reference frame based on the pitch rate of the machine in the body reference frame, the roll of the machine, and the turning rate of the machine. The method may further include controlling the earth moving implement based on the pitch rate of the machine in the gravity reference frame.

20 Claims, 3 Drawing Sheets

IMPLEMENT CONTROLLER HAVING ANGULAR RATE CORRECTION

TECHNICAL FIELD

The present disclosure relates generally to an implement controller in an earth-moving machine and, more particularly, to an implement controller in an earth-moving machine having angular rate correction.

BACKGROUND

Machines such as, for example, dozers, motor graders, wheel loaders, wheel tractor scrapers, and other types of heavy equipment are used to perform a variety of tasks. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The heading (also referred to as "yaw"), roll, and pitch of the machine are parameters whose accuracy may be important for control and positioning of the machine.

Conventional machines typically utilize a positioning system to determine various operating parameters such as velocity, pitch rate, yaw rate, roll rate, etc. The positioning system relies on Global Navigation Satellite System (GNSS) data along with data from an Inertial Measurement Unit (IMU) to calculate the yaw, roll, and pitch of the machine. As an example, a 4-degree of freedom (4 DOF) IMU may be utilized to determine the attitude (orientation) of the machine. A 4 DOF IMU consists of 3 accelerometers and a single gyroscope that measures an angular rate of the machine, for example, a pitch rate of the machine.

A reliable indication of the pitch rate and pitch of the machine is desirable in a machine that includes an earth moving implement such as a blade or a bucket. If the machine controller receives an accurate pitch or pitch rate measurement, the controller may be able to keep the earth moving implement stable so that it may be easily controlled by the operator of the machine. While the gyroscope in the 4 DOF IMU provides a reliable indicator of the pitch rate relative to the inertial-body reference frame ("body reference frame") of the machine, the gyroscope in the 4 DOF IMU does not provide a reliable indication of the pitch rate relative to the gravity earth-tangent reference frame ("gravity reference frame"). The body reference frame is a reference frame that describes movement relative to itself (the body of the system) in space. The gravity reference frame is a reference frame that describes the position, orientation, and movement relative to the earth's surface.

The gyroscope's inability to provide a reliable indication of the pitch rate relative to the gravity reference frame may be illustrated by considering an example of a tractor positioned on a hill pitched 45 degrees with 0 degrees of roll. If the tractor now turns (yaws) 180 degrees, the tractor is pitched negative 45 degrees with 0 degrees of roll with respect to the earth's surface. However, the gyroscope will not detect this change in pitch because the gyroscope measures the change in pitch with respect to the machine's body and not with respect to the earth's surface. An inaccurate reading of the pitch of the machine may result in the controller not being able to keep the earth moving implement stable or maintain a desired grade for the earth moving implement.

An exemplary system used to control a blade of a machine is disclosed in U.S. Patent Publication No. 2009/0069987 to Omelchenko et al. ("Omelchenko") that published on Mar. 12, 2009. The Omelchenko publication provides a system that controls a blade elevation and blade slope angle. The Omelchenko system compensates tangential and centripetal accelerations arising from circular motions of a machine. For compensating the tangential and centripetal accelerations, the Omelchenko system uses rotation matrices that denote rotation between a blade frame (a reference frame fixed with respect to the blade) and a vehicle frame (a reference frame fixed with respect to the dozer body).

Although the Omelchenko system may be useful in controlling the blade of a machine, the Omelchenko system may not provide an adequate correction for the angular rates that are determined in the body reference frame. For example, the Omelchenko system may not properly convert a pitch rate from the body reference frame to the gravity reference frame.

The implement controller of the present disclosure is directed toward solving one or more of the problems set forth above and/or other problems of the prior art.

SUMMARY

In one aspect, the present disclosure is directed to an implement controller for controlling an earth moving implement of a machine. The implement controller may include a pitch rate sensor configured to provide a pitch rate of the machine in a body reference frame. The implement controller may further include a roll sensor configured to provide a signal indicative of a roll of the machine. The implement controller may further include a turning rate sensor configured to provide a signal indicative of a turning rate of the machine, and a controller in communication with the pitch rate sensor, the roll sensor, and the turning rate sensor. The implement controller may be configured to determine a roll of the machine based on the signal indicative of the roll of the machine, determine a turning rate of the machine based on the signal indicative of the turning rate of the machine, and calculate a pitch rate of the machine in a gravity reference frame based on the pitch rate of the machine in the body reference frame, the roll of the machine, and the turning rate of the machine. The implement controller may be further configured to control the earth moving implement of the machine based on the pitch rate of the machine in the gravity reference frame.

In another aspect, the present disclosure is directed to a method of controlling an earth moving implement of a machine. The method may include receiving a pitch rate of the machine in a body reference frame and determining a roll of the machine. The method may further include determining a turning rate of the machine and calculating a pitch rate of the machine in a gravity reference frame based on the pitch rate of the machine in the body reference frame, the roll of the machine, and the turning rate of the machine. The method may further include controlling the earth moving implement of the machine based on the pitch rate of the machine in the gravity reference frame.

In yet another aspect, the present disclosure is directed to a non-transitory computer-readable storage device configured to store instructions for enabling a processor to execute a method of controlling an earth moving implement of a machine. The method may include receiving a pitch rate of the machine in a body reference frame and determining a roll of the machine. The method may further include determining a turning rate of the machine and calculating a pitch rate of the machine in a gravity reference frame based on the pitch rate of the machine in the body reference frame, the roll of the machine, and the turning rate of the machine. The method may further include controlling the earth moving implement of the machine based on the pitch rate of the machine in the gravity reference frame.

DETAILED DESCRIPTION

Figure 1:
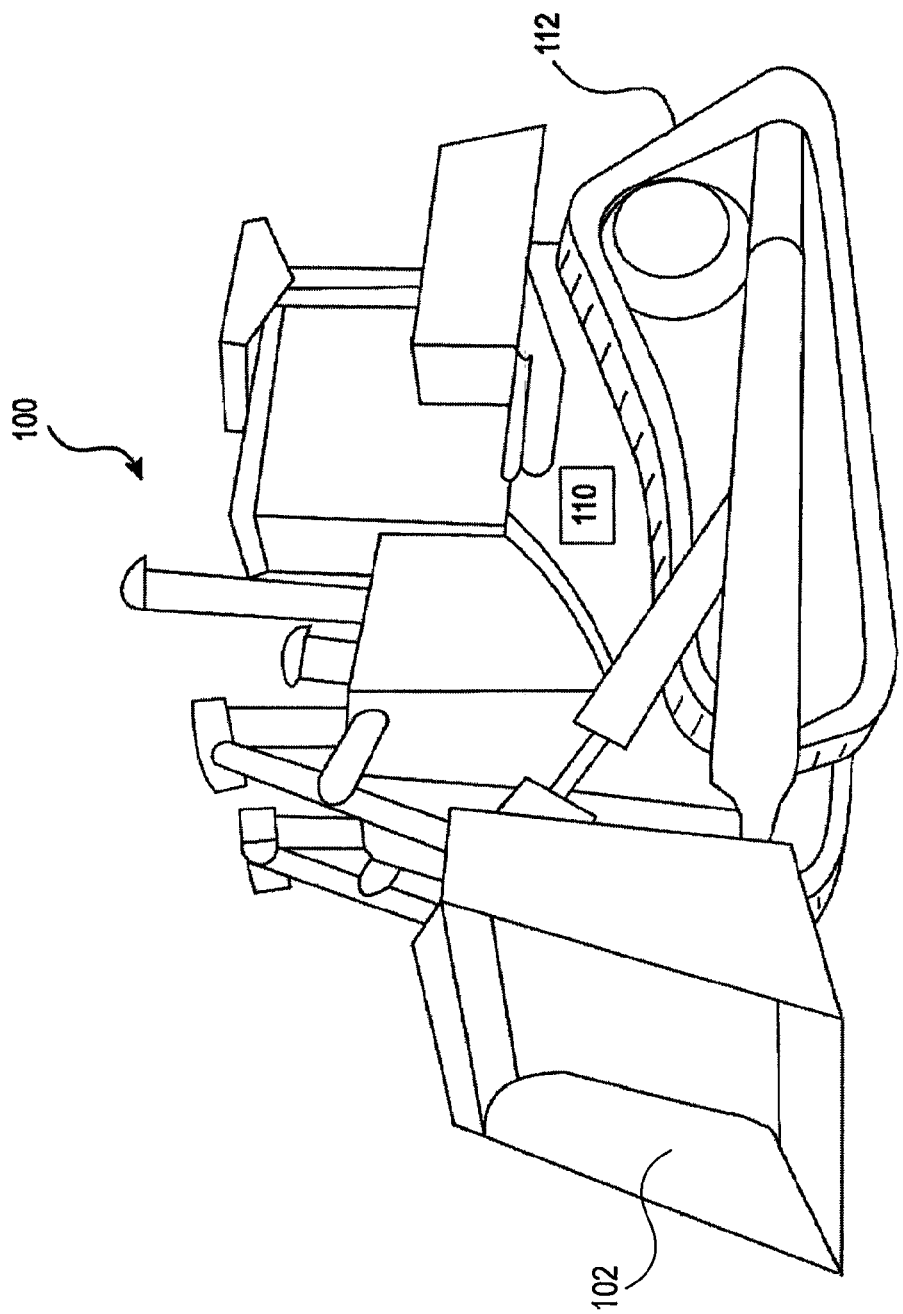
FIG. 1 is a pictorial illustration of an exemplary disclosed machine.

FIG. 1 illustrates a machine 100 having an earth moving implement 102 (for example, a blade or a bucket) and an exemplary disclosed implement controller 110. The machine 100 may be configured to perform some type of operation associated with an industry such as mining, construction, farming, transportation, power generation, or any other industry known in the art. The earth moving implement 102 earth moving implement 102 may be utilized to move earth or soil. For illustrative purposes, the earth moving machine 100 is shown as a track-type bulldozer. While the present disclosure is described in conjunction with a bulldozer, it is intended that exemplary aspects of the present disclosure will also be used on other types of earth moving machines, such as other track or wheel-type machines. Further, the machine 100 may generally include a frame that at least partially defines or supports an operator station, one or more engines mounted to the frame, a plurality of traction devices 112 driven by the engine to propel machine 100, etc. The traction devices 112, in the disclosed exemplary embodiments, are tracks located at opposing sides of machine 100. Each track may be independently driven to turn machine 100 or simultaneously and dependently driven to propel machine 100 in a straight direction. It is contemplated that one or all of traction devices 112 may be replaced with another type of traction device, if desired, such as belts or wheels.

Figure 2:
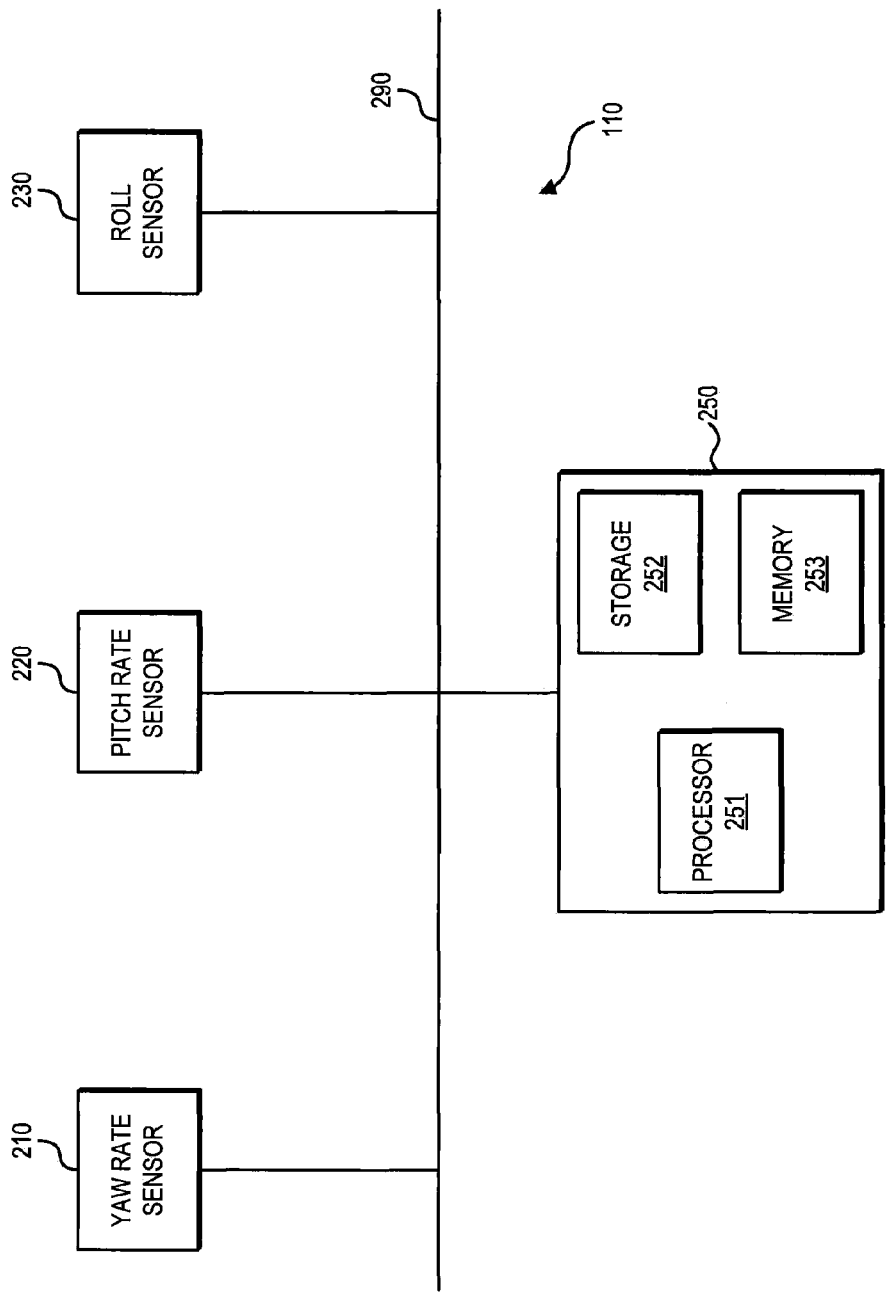
FIG. 2 is a diagrammatic illustration of an exemplary disclosed implement controller that may be used in conjunction with the machine of FIG. 1.

FIG. 2 illustrates an exemplary embodiment of the implement controller 110. The implement controller 110 may include a yaw rate sensor 210, a pitch rate sensor 220, a roll sensor 230, and a controller 250. The above sensors and the controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

The yaw rate sensor 210 may include a device capable of measuring a yaw rate (for example, a turning rate) of the machine 100, and producing a corresponding yaw rate signal. Exemplarily, the yaw rate sensor 210 may include a device that provides a speed of the right and left traction devices 112 of the machine 100. In another exemplary embodiment, the yaw rate sensor 210 may include dual GPS receivers mounted side by side on the earth moving implement 102 of the machine 100 may provide a signal indicative of the yaw rate that can be processed by the controller 250 to obtain the yaw rate of the machine 100. In yet another exemplary embodiment, a single GPS receiver mounted to the machine 100 may provide an indication that can be processed by the controller 250 to obtain the yaw rate of the machine 100. For example, the controller 250 may utilize the GPS signals received from the GPS receiver and calculate the yaw rate of the machine 100 based on a change in the location of the machine 100 indicated by the GPS signal over a period of time. In another exemplary embodiment, the yaw rate sensor 210 may be a single gyroscope.

The pitch rate sensor 220 may include a device (such as a gyroscope) capable of measuring a pitch rate of the machine 100, and producing a corresponding pitch rate signal.

The roll sensor 230 may include a device capable of providing a signal indicative of a roll of the machine 100. Exemplarily, the roll sensor 230 may include dual GPS receivers mounted side by side on the earth moving implement 102 of the machine 100 that provides elevation signals. Elevation signals output by the dual GPS receivers may be processed by the controller 250 to determine the roll of the machine 100. In an exemplary embodiment, the same dual GPS receivers may provide both the yaw rate and the roll for the machine 100. That is, in an exemplary embodiment, the yaw rate sensor 210 and the roll sensor 230 may be the same device, namely, dual GPS receivers. In another exemplary embodiment, the roll sensor 230 may include an accelerometer that outputs an acceleration signal that may be processed by the controller 250 to determine the roll of the machine 100.

The controller 250 may include a processor 251, a storage 252, and a memory 253 assembled together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. The memory 253 may include one or more storage devices configured to store information used by the controller 250 to perform certain functions related to disclosed embodiments. The storage 252 may include a volatile or non-volatile, magnetic, semiconductor, tape, optical, removable, nonremovable, or other type of storage device or computer-readable medium. The storage 252 may store programs and/or other information, such as information related to processing data received from one or more sensors, as discussed in greater detail below.

In one exemplary embodiment, the memory 253 may include one or more angular correction and earth moving implement control programs or subprograms loaded from the storage 252 or elsewhere that, when executed by the processor 251, perform various procedures, operations, or processes consistent with disclosed embodiments. For example, the memory 253 may include one or more programs that enable the controller 250 to, among other things, collect data from the above-mentioned sensors, process the data to correct a pitch rate, and control the earth moving implement 102 of the machine 100 in accordance with the corrected pitch rate.

According to an exemplary embodiment, the controller 250 may calculate the roll of the machine 100 based on signals received from the roll sensor 230. As stated above, the roll sensor 230 may include dual GPS receivers mounted side by side on the earth moving implement 102. Exemplarily, the controller 250 may calculate the roll as follows:

$$\text{Machine\_Roll} = a\sin[(\text{right\_gps\_elev} - \text{left\_gps\_elev})/\text{horizontal\_distance\_between\_gps})]$$

In the above equation, the controller 250 calculates a difference in elevations of the dual GPS receivers (right and left GPS receivers) and divides the elevation difference by the horizontal distance between the receivers to obtain the roll of the machine 100.

The controller 250 may also calculate the yaw rate of the machine 100 based on signals received from the yaw rate sensor 210. If the yaw rate sensor 210 outputs an indication of the speed of the right and left traction devices 112, the controller may determine a yaw rate of the machine 100 as follows:

Machine_Yaw_Rate=$a$ sin [(right_track spd−left_track_spd)/distance_between_track)]

In the above equation, the controller 250 calculates a difference between the right and left traction device speeds and divides the difference by the distance between the right and left traction devices to obtain the yaw rate of the machine 100. Exemplarily, the controller 250 may adjust the calculated yaw rate to account for slipping of the traction devices 112.

If the yaw rate sensor 210 is constituted by dual GPS receivers mounted to the earth moving implement 102, the controller 250 may calculate the yaw rate from location signals received from the dual GPS receivers. For example, the controller 250 may calculate the yaw rate based on a change in the location of the machine 100 indicated by the GPS signals over a period of time. If the controller 250 utilizes location signals from the dual GPS receivers mounted to the earth moving implement 102, the controller 250 may take steering commands into account when calculating the yaw rate to ensure that the yaw rate is not being caused by the earth moving implement 102 being angled. That is, the controller 250 may first check whether a steering command has been provided to the machine 100 and if a steering command has been provided, the controller 250 may calculate the yaw rate based on location signals received from the dual GPS receivers.

Having calculated the yaw rate and the roll of the machine 100, the controller 250 may calculate a pitch rate of the machine 100 in the gravity reference frame. The pitch rate of the machine 100 in the gravity reference frame is referred to as the gravity pitch rate in this disclosure. Exemplarily, the controller 250 may receive a pitch rate from the pitch rate sensor 220 that is measured in the body reference frame and calculate the gravity pitch rate (Pitch_Rate_Gravity) as follows:

Pitch_Rate_Gravity=Pitch_Rate_Body−Machine_Yaw_Rate×sin(Machine_Roll)

In the above equation, Pitch_Rate_Body (also referred to as "body pitch rate") refers to the pitch rate of the machine 100 received from the pitch rate sensor 220, Machine_Yaw_Rate refers to the yaw rate calculated by the controller 250, and Machine_Roll refers to the roll of the machine 100 calculated by the controller 250.

Having calculated the gravity pitch rate, the controller 250 may utilize the gravity pitch rate as a control input to control the earth moving implement 102. Exemplarily, the controller 250 may also integrate the gravity pitch rate to determine a pitch of the machine 100 and utilize the pitch of the machine 100 to control the earth moving implement 102. The controller 250 may also determine other parameters of the machine 100 such as velocity and position by utilizing other sensors not described herein or by utilizing the disclosed sensors such as the dual GPS receivers. In an exemplary embodiment, the controller 250 may utilize a desired set point along with the position and pitch information of the machine 100 to apply control signals to the machine 100's hydraulic lift cylinders in order to control the earth moving implement 102.

Figure 3:
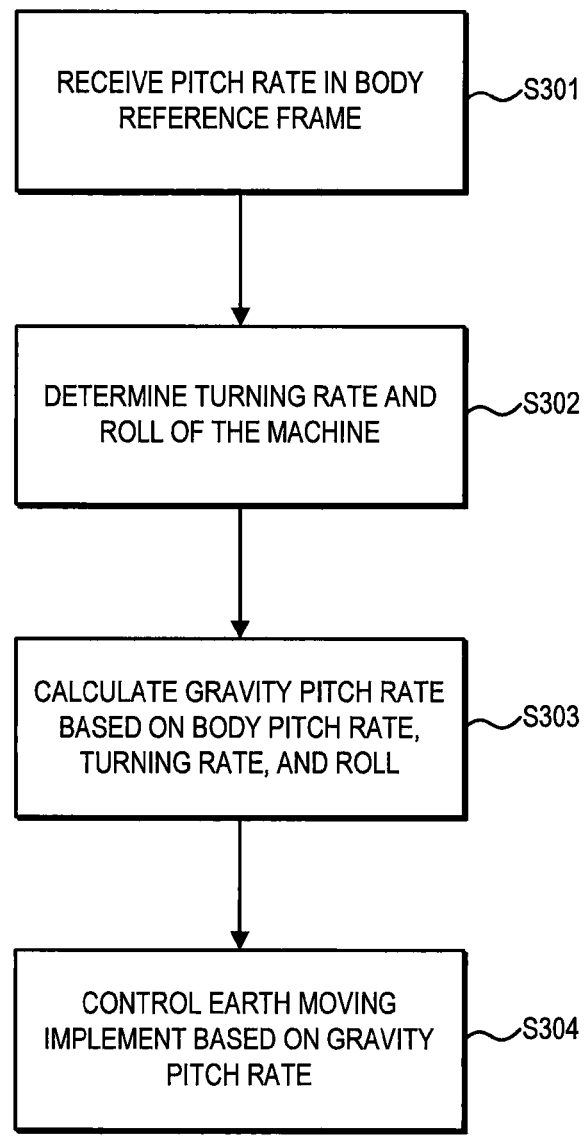
FIG. 3 is a flowchart depicting an exemplary disclosed method performed by the implement controller of FIG. 2.

FIG. 3 is an exemplary process implemented by the controller 250 to control the earth moving implement 102 of the machine 100 based on the gravity pitch rate. A detailed description of FIG. 3 is provided in the next section.

INDUSTRIAL APPLICABILITY

The disclosed implement controller 110 may be applicable to any machine where improved control of the machine's earth moving implement is desired. The disclosed implement controller 110 may provide for improved control of the machine's earth moving implement by converting pitch rate measured in the machine's body reference frame to a pitch rate in the gravity reference frame by utilizing other machine parameters such as yaw rate and roll. Operation of the exemplary implement controller 110 will now be described in connection with the flowchart of FIG. 3.

In step 301, the controller 250 may receive a pitch rate measurement from the pitch rate sensor 220. The received pitch rate measurement may be a measurement in the body reference frame of the machine 100.

Next, in step 302, the controller 250 may determine the turning rate and the roll of the machine 100. For example, the controller 250 may calculate the roll of the machine 100 based on signals received from the roll sensor 230. As stated above, the roll sensor 230 may include dual GPS receivers mounted side by side on the earth moving implement 102. As discussed above, the controller 250 may calculate the roll as follows:

Machine_Roll=$a$ sin [(right_gps_elev−left_gps_elev)/horizontal_distance_between_gps)]

In step 302, the controller 250 may also calculate the yaw rate of the machine 100 based on signals received from the yaw rate sensor 210. If the yaw rate sensor 210 outputs an indication of the speed of the right and left traction devices 112, as discussed above, the controller may determine a yaw rate of the machine 100 as follows:

Machine_Yaw_Rate=$a$ sin [(right_track_spd−left_track_spd)/distance_between_track)]

Exemplarily, the controller 250 may also calculate the yaw rate of the machine 100 based on location signals received from the dual GPS receivers in the roll sensor 230.

Next, in step 303, the controller 250 may convert the body pitch rate received from the pitch rate sensor 220 to the gravity pitch rate. As discussed above, the controller 250 may perform the following calculation:

Pitch_Rate_Gravity=Pitch_Rate_Body−Machine_Yaw_Rate×sin(Machine_Roll)

Having calculated the gravity pitch rate, the controller 250 may utilize the gravity pitch rate as a control input to control the earth moving implement 102 in step 304. Exemplarily, the controller 250 may also integrate the gravity pitch rate to determine a pitch of the machine 100 and utilize the pitch of the machine 100 to control the earth moving implement 102. The controller 250 may also determine other parameters of the machine 100 such as velocity and position by utilizing other sensors not described herein or by utilizing the disclosed sensors such as the dual GPS receivers. Exemplarily, in step 304, the controller 250 may utilize a desired set point along with the position and pitch information of the machine 100 to apply control signals to the machine 100's hydraulic lift cylinders in order to control the earth moving implement 102.

The process may continue to repeat in this manner until receiving instructions to stop or until new data ceases to be collected from the machine 100.

The disclosed exemplary embodiments may allow for improved control of an earth moving implement, such as a blade or a bucket, attached to a machine. For example, by converting a pitch rate measured in the body reference frame to a pitch rate in the gravity reference frame, improved control of the earth moving implement of the machine 100 may be possible.

It will be apparent to those skilled in the art that various modifications and variations can be made to the disclosed implement controller. Other embodiments will be apparent to those skilled in the art from consideration of the specification and practice of the disclosed implement controller. It is intended that the specification and examples be considered as exemplary only, with a true scope being indicated by the following claims and their equivalents.

What is claimed is:

1. A method of controlling an earth moving implement of a machine, comprising:
   receiving a pitch rate of the machine in a body reference frame;
   determining a roll of the machine;
   determining a turning rate of the machine;
   calculating a pitch rate of the machine in a gravity reference frame based on the pitch rate of the machine in the body reference frame, the roll of the machine, and the turning rate of the machine; and
   controlling the earth moving implement based on the pitch rate of the machine in the gravity reference frame.

2. The method of claim 1, wherein the pitch rate of the machine is received from a gyroscope.

3. The method of claim 1, wherein the roll of the machine is determined based on signals received from a first GPS receiver and a second GPS receiver mounted side by side on the earth moving implement.

4. The method of claim 3, wherein the roll of the machine is calculated as:

$$\text{Machine\_Roll} = a\sin[(\text{right\_gps\_elev} - \text{left\_gps\_elev})/\text{horizontal\_distance\_between\_gps}],$$

where, Machine_Roll is the roll of the machine, right_gps_elev is an elevation of the first GPS receiver, left_gps_elev is an elevation of the second GPS receiver, and horizontal_distance_between_gps is a distance between the first and second GPS receivers.

5. The method of claim 1, wherein the pitch rate of the machine in the gravity reference frame is calculated as:

$$\text{Pitch\_Rate\_Gravity} = \text{Pitch\_Rate\_Body} - \text{Machine\_Yaw\_Rate} \times \sin(\text{Machine\_Roll}),$$

where Pitch_Rate_Gravity refers to the pitch rate of the machine in the gravity reference frame, Pitch_Rate_Body refers to the pitch rate of the machine in the body reference frame, Machine_Yaw_Rate refers to the turning rate, and Machine_Roll refers to the roll.

6. The method of claim 1, wherein determining the turning rate includes:
   detecting a traction device speed for a right traction device and a left traction device, and
   determining the turning rate based on a difference between the traction device speeds for the right traction device and the left traction device.

7. The method of claim 6, wherein the turning rate is determined as follows:

$$\text{Machine\_Yaw\_Rate} = a\sin[(\text{right\_track\_spd} - \text{left\_track\_spd})/\text{distance\_between\_track}],$$

where Machine_Yaw_Rate refers to the turning rate, right_track_spd refers to the traction device speed of the right traction device, left_track_spd refers to the traction device speed of the left traction device, and distance_between_track refers to a distance between the right and left traction devices.

8. An implement controller for controlling an earth moving implement of a machine, comprising:
   a pitch rate sensor configured to provide a pitch rate of the machine in a body reference frame;
   a roll sensor configured to provide a signal indicative of a roll of the machine;
   a turning rate sensor configured to provide a signal indicative of a turning rate of the machine; and
   a controller in communication with the pitch rate sensor, the roll sensor, and the turning rate sensor, the controller configured to:
   determine a roll of the machine based on the signal indicative of the roll of the machine,
   determine a turning rate of the machine based on the signal indicative of the turning rate of the machine,
   calculate a pitch rate of the machine in a gravity reference frame based on the pitch rate of the machine in the body reference frame, the roll of the machine, and the turning rate of the machine, and
   control the earth moving implement based on the pitch rate of the machine in the gravity reference frame.

9. The implement controller of claim 8, wherein the pitch rate sensor includes a gyroscope.

10. The implement controller of claim 8, wherein the roll sensor includes a first GPS receiver and a second GPS receiver mounted side by side on the earth moving implement.

11. The implement controller of claim 10, wherein the controller is configured to calculate the roll of the machine as:

$$\text{Machine\_Roll} = a\sin[(\text{right\_gps\_elev} - \text{left\_gps\_elev})/\text{horizontal\_distance\_between\_gps}]$$

where, Machine_Roll is the roll of the machine, right_gps_elev is an elevation of the first GPS receiver, left_gps_elev is an elevation of the second GPS receiver, and horizontal_distance_between_gps is a distance between the first and second GPS receivers.

12. The implement controller of claim 8, wherein the controller is configured to calculate the pitch rate of the machine in the gravity reference frame as:

$$\text{Pitch\_Rate\_Gravity} = \text{Pitch\_Rate\_Body} - \text{Machine\_Yaw\_Rate} \times \sin(\text{Machine\_Roll}),$$

where Pitch_Rate_Gravity refers to the pitch rate of the machine in the gravity reference frame, Pitch_Rate_Body refers to the pitch rate of the machine in the body reference frame, Machine_Yaw_Rate refers to the turning rate, and Machine_Roll refers to the roll.

13. The implement controller of claim 8, wherein the controller is configured to determine the turning rate by:
    detecting a traction device speed for a right traction device and a left traction device, and
    determining the turning rate based on a difference between the traction device speeds for the right traction device and the left traction device.

14. The implement controller of claim 13, wherein the controller is configured to determine the turning rate as follows:

$$\text{Machine\_Yaw\_Rate} = a\sin[(\text{right\_track\_spd} - \text{left\_track\_spd})/\text{distance\_between\_track}],$$

where Machine_Yaw_Rate refers to the turning rate, right_track_spd refers to the traction device speed of the right traction device, left_track_spd refers to the traction device speed of the left traction device, and distance_between_track refers to a distance between the right and left traction devices.

15. A non-transitory computer-readable storage medium storing instructions for enabling a processor to execute a method controlling an earth moving implement of a machine, the method comprising:
  receiving a pitch rate of the machine in a body reference frame;
  determining a roll of the machine;
  determining a turning rate of the machine;
  calculating a pitch rate of the machine in a gravity reference frame based on the pitch rate of the machine in the body reference frame, the roll of the machine, and the turning rate of the machine; and
  controlling the earth moving implement based on the pitch rate of the machine in the gravity reference frame.

16. The non-transitory computer-readable storage medium of claim 15, wherein the pitch rate of the machine is received from a gyroscope.

17. The non-transitory computer-readable storage medium of claim 15, wherein the roll of the machine is determined based on signals received from a first GPS receiver and a second GPS receiver mounted side by side on the earth moving implement.

18. The non-transitory computer-readable storage medium of claim 17, wherein the roll of the machine is calculated as:

$$\text{Machine\_Roll} = a\sin[(\text{right\_gps\_elev} - \text{left\_gps\_elev})/\text{horizontal\_distance\_between\_gps}],$$

where Machine_Roll is the roll of the machine, right_gps_elev is an elevation of the first GPS receiver, left_gps_elev is an elevation of the second GPS receiver, and horizontal_distance_between_gps is a distance between the first and second GPS receivers.

19. The non-transitory computer-readable storage medium of claim 15, wherein the pitch rate of the machine in the gravity reference frame is calculated as:

$$\text{Pitch\_Rate\_Gravity} = \text{Pitch\_Rate\_Body} - \text{Machine\_Yaw\_Rate} \times \sin(\text{Machine\_Roll}),$$

where Pitch_Rate_Gravity refers to the pitch rate of the machine in the gravity reference frame, Pitch_Rate_Body refers to the pitch rate of the machine in the body reference frame, Machine_Yaw_Rate refers to the turning rate, and Machine_Roll refers to the roll.

20. The non-transitory computer-readable storage medium of claim 15, wherein determining the turning rate includes:
  detecting a traction device speed for a right traction device and a left traction device, and
  determining the turning rate based on a difference between the tractor device speeds for the right traction device and the left traction device.

* * * * *